(12) United States Patent
Smith

(10) Patent No.: US 8,102,781 B2
(45) Date of Patent: Jan. 24, 2012

(54) DYNAMIC DISTRIBUTION OF VIRTUAL MACHINES IN A COMMUNICATION NETWORK

(75) Inventor: Michael Smith, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 318 days.

(21) Appl. No.: 12/221,160

(22) Filed: Jul. 31, 2008

(65) Prior Publication Data

US 2010/0027420 A1 Feb. 4, 2010

(51) Int. Cl.
*H04L 12/26* (2006.01)

(52) U.S. Cl. ............ 370/252; 718/1; 709/224; 709/226

(58) Field of Classification Search .................. 370/252, 370/253; 709/220, 221, 223, 224, 226; 718/1; 708/1

See application file for complete search history.

(56) References Cited

U.S. PATENT DOCUMENTS

| | | | |
|---|---|---|---|
| 6,802,062 B1 * | 10/2004 | Oyamada et al. | 718/1 |
| 2003/0014524 A1 | 1/2003 | Tormasov | |
| 2003/0235209 A1 | 12/2003 | Garg et al. | |
| 2006/0230407 A1 * | 10/2006 | Rosu et al. | 718/105 |
| 2007/0028244 A1 | 2/2007 | Landis et al. | |
| 2007/0204266 A1 * | 8/2007 | Beaty et al. | 718/1 |
| 2008/0028398 A1 | 1/2008 | Cherkasova et al. | |
| 2008/0082977 A1 * | 4/2008 | Araujo et al. | 718/1 |
| 2008/0155537 A1 * | 6/2008 | Dinda et al. | 718/1 |
| 2008/0201414 A1 * | 8/2008 | Amir Husain et al. | 709/203 |

* cited by examiner

*Primary Examiner* — Ricky Ngo
*Assistant Examiner* — Wei-Po Kao
(74) *Attorney, Agent, or Firm* — Cindy Kaplan (57) ABSTRACT

In one embodiment, a method generally includes monitoring network traffic associated with a first network device comprising at least one of a plurality of virtual machines and determining if a parameter exceeds a predefined threshold at the first network device. If the parameter exceeds the predefined threshold, one of the virtual machines is selected to move to a second network device, the second network device selected based on network information, and the virtual machine is moved. An apparatus for resource allocation is also disclosed.

17 Claims, 7 Drawing Sheets

| | M1, V1 (VM A) | M2, V2 (VM B) | M3, V3 (VM C) | M4, V4 (VM D) | M5, V5 (VM E) |
|---|---|---|---|---|---|
| VM A | 10Kb | 100Kb | 200Kb | 7.3Mb | 10Mb |
| VM B | | | 340Kb | 2Mb | 80Mb |

| Server | Far-end | Path cost |
|--------|---------|-----------|
| 28 | VM A | 200 |
|    | VM C | 0 |
|    | VM D | 0 |
|    | VM E | 220 |
| 30 | VM A | 220 |
|    | VM C | 220 |
|    | VM D | 220 |
|    | VM E | 0 |

FIGURE 5

| Server | Far-end | Path cost | Weighted Path cost | Total |
|---|---|---|---|---|
| 28 | VM A | 200 | 2000 | 17,602,000 |
| | VM C | 0 | 0 | |
| | VM D | 0 | 0 | |
| | VM E | 220 | 17600000 | |
| 30 | VM A | 220 | 2200 | 517,000 |
| | VM C | 220 | 74800 | |
| | VM D | 220 | 440000 | |
| | VM E | 0 | 0 | |

DYNAMIC DISTRIBUTION OF VIRTUAL MACHINES IN A COMMUNICATION NETWORK

BACKGROUND OF THE INVENTION

The present disclosure relates generally to communication networks, and more particularly, to resource allocation through dynamic distribution of virtual machines in a communication network.

Data centers often use a small percentage of available CPU, storage, and memory capacity. This results in deployment of more servers than are necessary to perform a specified amount of work. Additional servers increase costs and create a more complex and disparate environment that can be difficult to manage. Many data center mangers are turning to virtualization so that resources can be shared across a network.

Virtualization is a technology which allows one computer to do the job of multiple computers by sharing resources of a single computer across multiple systems. Through the use of virtualization, multiple operating systems and applications can run on the same computer at the same time, thereby increasing utilization and flexibility of hardware. Virtualization allows servers to be decoupled from underlying hardware, thus resulting in multiple virtual servers sharing the same physical server hardware. This also allows the virtual server to be moved from one physical server to another physical server while maintaining continuous service availability.

BRIEF DESCRIPTION OF THE DRAWINGS

Corresponding reference characters indicate corresponding parts throughout the several views of the drawings.

DESCRIPTION OF EXAMPLE EMBODIMENTS

Overview

In one embodiment, a method generally includes monitoring network traffic associated with a first network device comprising at least one of a plurality of virtual machines and determining if a parameter exceeds a predefined threshold at the first network device. If the parameter exceeds the predefined threshold, one of the virtual machines is selected to move to a second network device, the second network device selected based on network information, and the virtual machine is moved.

In another embodiment, an apparatus generally comprises a monitor configured for monitoring network traffic associated with a virtual machine located at the apparatus and a controller configured for determining if one or more network parameters exceed a predefined threshold and if the network parameters exceed the predefined threshold, select one of the virtual machines to move to a network device, the network device selected based on network information, and move the selected virtual machine to the network device. The apparatus further includes memory for storing the network information.

Example Embodiments

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Virtualization allows one computer to do the job of multiple computers by sharing the resources of a single computer across multiple systems. Software is used to virtualize hardware resources of a computer, including, for example, the CPU, RAM, hard disk, and network controller, to create a virtual machine that can run its own operating system and applications. Multiple virtual machines share hardware resources without interfering with each other so that several operating systems and applications can be run at the same time on a single computer. Virtual machines may be used, for example, in a virtual infrastructure to dynamically map physical resources to business needs. Virtualization thus enables the aggregation of multiple servers, storage infrastructure, and networks into shared resources that can be delivered dynamically to applications as needed.

Application performance in virtualization systems is dependent on a number of factors that include CPU availability, memory availability, network bandwidth availability, and network latency. Within a data center, traffic patterns are highly dependent on the applications deployed. Within a campus, traffic patterns are largely from clients in the campus to servers in the data centers or servers present in the general Internet. In the data center, a large amount of traffic is between servers within the data center, such as front end applications communicating with back end applications. Latency is dependent on basic latency of the equipment and links between two communicating nodes as well as network congestion in between those nodes. The placement of applications within the data center will have an impact on the application performance. Factors considered in application network placement in conventional virtualization systems are limited to CPU and memory availability. However, network location in relation to the other nodes with which a given node communicates is also an important factor to consider when placing an application within the data center. Determining the optimal placement of applications within the network is thus much more complicated than simply examining CPU and memory utilization.

The embodiments described herein utilize networking requirements of the virtual machines to dynamically distribute the virtual machines across the physical devices. The placement of a virtual machine in the network can be optimized by considering application traffic patterns, network topology, latency, bandwidth requirements, or any combination thereof. As described further below, distributed or centralized resource scheduling may be used to automate initial virtual machine placement and continuously optimize placement of the virtual machines based on current workload.

Figure 1:
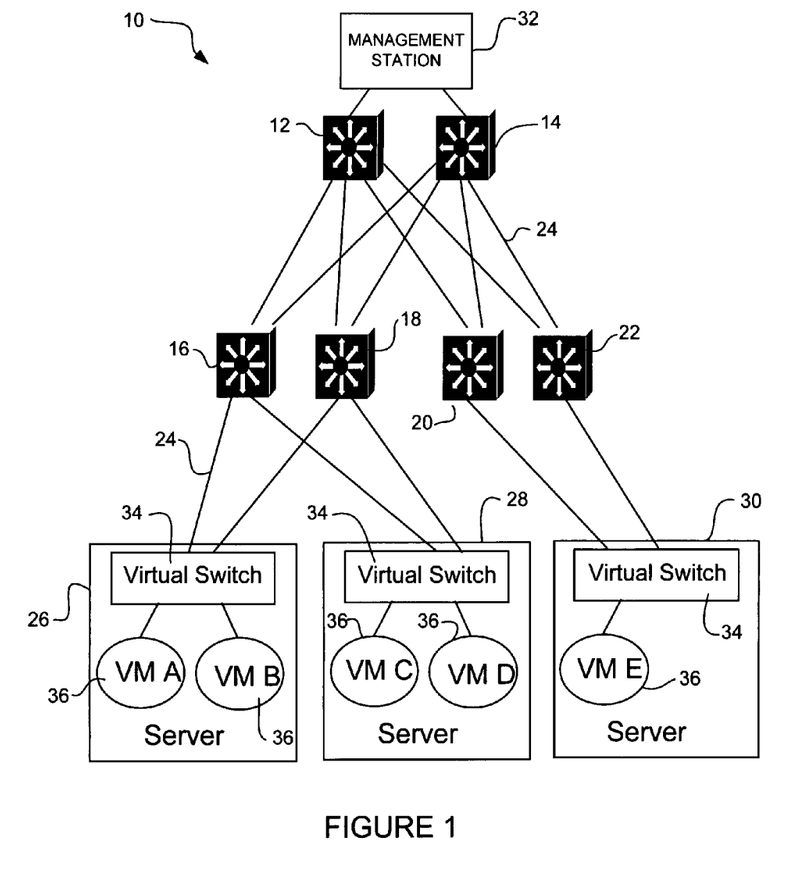
FIG. 1 illustrates an example of a network in which embodiments described herein may be implemented.

Referring now to the drawings, and first to FIG. 1, an example of a network 10 that may implement embodiments described herein is shown. For simplification, only a small number of nodes are shown. The system operates in the context of a data communication network including multiple network elements. Some of the elements in a network that employs the system may be network devices such as servers, switches, or routers. The network device may include, for example, a master central processing unit (CPU), interfaces, and a bus. The CPU preferably includes memory and a processor. The network device may be implemented on a general purpose network machine such as described below with respect to FIG. 7.

The network 10 shown in FIG. 1 includes a number of switches 12, 14, 16, 18, 20, 22 interconnected by links 24. Switches (e.g., edge access switches) 16, 18, 20, 22 are each connected to one or more servers 26, 28, 30. In the example shown in FIG. 1, switch 16 is connected to servers 26 and 28, switch 18 is connected to servers 26 and 28, switch 20 is connected to server 30, and switch 22 is connected to server 30. The switches may also be in communication with a management station 32 (e.g., VMware Virtual Center management station or other virtualization management platform).

Each server 26, 28, 30 includes a virtual switch 34 and one or more virtual machines 36. In the example shown in FIG. 1, server 26 includes virtual machine (VM) A and VM B, server 28 includes VM C and VM D, and server 30 includes VM E. As described below, each of the virtual machines may be moved from one server to another server. The virtual machines 36 are in communication with the virtual switch 34 via a virtual network interface card (NIC) and the virtual switch 34 is in communication with the switches via an Ethernet interface (physical network interface card). The virtual switch 34 switches traffic between the virtual machines and the physical network interface card. In one embodiment, the virtual switch 34 is configured to operate in a hypervisor environment. Virtual machines 36 located within the same server (e.g., VM A and VM B in FIG. 1) may also communicate directly with one another via the virtual switch 34.

It is to be understood that the simplified network shown in FIG. 1 is only one example, and that the embodiments described herein be employed in networks having different configurations and types of network devices.

Figure 2:
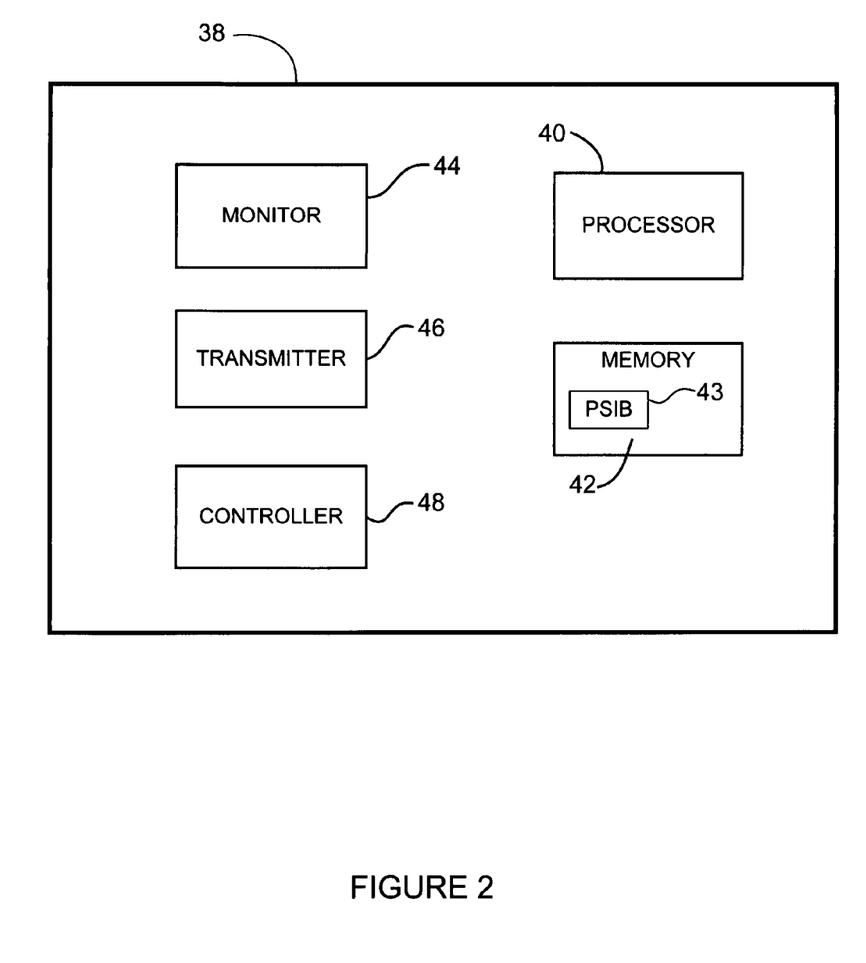
FIG. 2 is a block diagram of a node configured to monitor network traffic and allocate resources.

FIG. 2 is a block diagram illustrating an example of an apparatus 38 configured for allocating resources in accordance with the embodiments described herein. The apparatus 38 may be one of the switches 12, 14, 16, 18, 20, 22, servers 26, 28, 30, (or virtual switch 34 at the server), management station 32, or other network device. As described in detail below, the calculations and decisions may be made at a single network device or may be performed over multiple network devices. The network device 38 shown in FIG. 2 includes a processor 40 and memory 42, such as described below with respect to FIG. 7, for example. In one embodiment the memory 42 includes a Physical Server Information Base (PSIB) 43, described below. The network device 38 further includes a monitor 44 for monitoring network traffic, a transmitter 46 for advertising server resource availability through the network, and a virtualization controller 48 configured for performing calculations based on network information and moving one or more of the virtual machines, if required. It is to be understood that the elements shown in FIG. 2 may be located at a single network device or the elements may be distributed across two or more network devices. If operations are centralized at a single device (e.g., management station 32), it may be possible to eliminate the transmitter 46.

Figure 3:
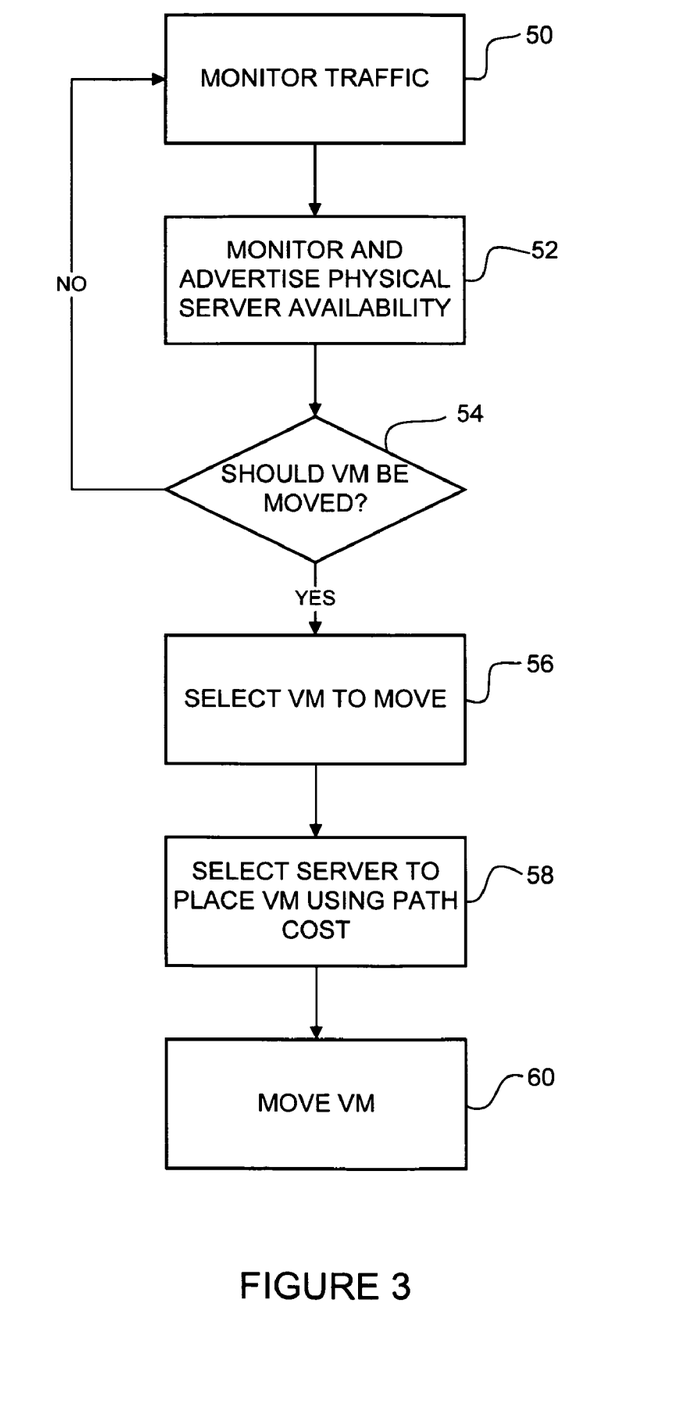
FIG. 3 is a flowchart illustrating a process for allocating resources.

FIG. 3 is a flowchart illustrating one example of a process for resource allocation. At step 50, traffic interactions are monitored. The network traffic associated with a first network device containing one or more of the virtual machines may be monitored at the virtual switch 34 located at the network device (server) 26, 28, 30, one of the switches 16, 18, 20, 22 in communication with the server, or another network device. For example, the management station 32 may monitor traffic interactions by receiving traffic information from the edge switch or server. In one embodiment, the monitoring is performed utilizing the edge access switch to monitor traffic from the local edge switch's virtual machines. The edge access switch tracks all of the MAC address, VLAN pairs that each local virtual machine communicates and tracks overall bandwidth communicated, as well as any additional information necessary such as peak bandwidth bursts. This provides a traffic matrix that can be built using Netflow technology or general traffic inspection.

Figure 4:
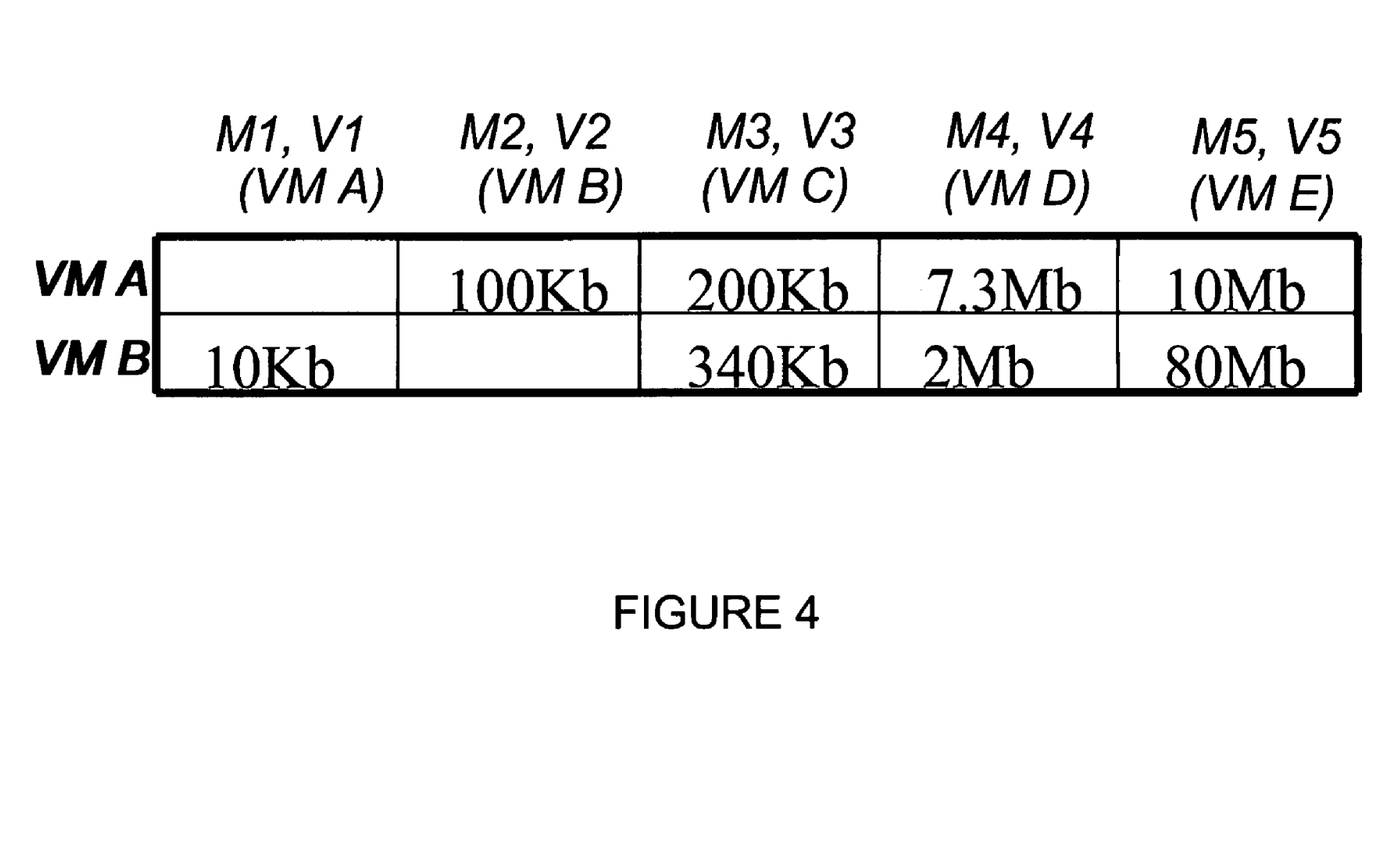
FIG. 4 is an example of a traffic matrix showing bandwidth utilization between virtual machines.

FIG. 4 is an example of a traffic matrix generated from monitoring traffic interactions at server 26. The traffic matrix of FIG. 4 shows bandwidth utilization between VM A and each of the other virtual machines (VM B, VM C, VM D, and VM E) in the first row. The second row of the traffic matrix shows bandwidth utilization between VM B and the other virtual machines.

At step 52, physical server availability is monitored and advertised (FIG. 3). In addition to monitoring traffic from the local virtual machines, the edge access switch (or other network device) may also monitor one or more of the following: CPU usage; CPU traits (CPU type, vendor and the like); memory; and power requirements of the physical servers to which it is connected. In one example, server 26 has 90% free CPU, 1 GB free memory, and 5 Mb free bandwidth. Server 28 has 23% free CPU, 2 GB free memory, and 85 Mb free bandwidth. Server 30 has 90% free CPU, 1 GB free memory, and 45 Mb free bandwidth. This information may be stored in the PSIB 43, for example.

The resource availability information may be available locally or retrieved from a remote source. For example, if a platform does not have a presence on the server, this information can be gathered through communication with an API (e.g., Virtual Center web services API). This information is then propagated to all switches within the L2 domain through a Physical Server Advertisement Protocol (PSAP). In one embodiment, this protocol broadcasts the information in a manner similar to LSAs (link state advertisements) sent in link state routing protocols. Since this information is not used to converge the network, but rather to optimize the application placement, the advertisement may be infrequent (e.g., five minute intervals). The broadcast interval may be configured by the user. In one embodiment, the information is stored in a local database (e.g., PSIB 43) by each edge switch in the data center. The local database is analogous to the Routing Information Base (RIB) used in routing. The information may also be stored at a central location (e.g., management station 32), server 26, 28, 30, or other network device.

At step 54, a determination is made as to whether a virtual machine should be moved (FIG. 3). This determination may be performed by the server 26, 28, 30, local edge switch 16, 18, 20, 22, management station 32, or another device. The edge switch can perform the calculation based on user influenced thresholds for CPU, memory, bandwidth, or other parameter, or combination of parameters at the physical server. For example, if the network bandwidth for a particular server is exceeding a predefined threshold for a period of time, the edge switch can attempt to move a virtual machine to a server that has more network bandwidth available. Similarly, if the CPU threshold is exceeded, the edge switch can move a virtual machine to a server that has more CPU compute cycles available. If this action is performed by the management station 32, the parameters can be fed into the management station by the edge switch 16, 18, 20, 22, for example.

At step 56, a virtual machine is selected for movement to another server (FIG. 3). The local edge switch, management station, or server may select a virtual machine to move based on networking parameter inputs. This decision is influenced by the threshold which is exceeded so that the server threshold levels are predicated to be met by moving the particular virtual machine. In the present example, VM B is selected to be moved from server 26 (first network device) to one of the other servers (second network device) (FIG. 1).

After a decision is made to move one of the virtual machines to another server, the best server at which to place the virtual machine is determined (step 58) (FIG. 3). The edge switch (or other device) examines the local copy of the PSIB to determine a subset (eligible server pool) of the PSIBs which can meet the requirements necessary to support the selected virtual machine. In the present example, it is determined that the eligible server pool that can handle VM B contains servers 28 and 30 (FIG. 1). This subset can be limited to an upper bound through user configuration or by implementation. The traffic information database may also be examined to determine which MAC address, VLAN pairs that the particular virtual machine communicates. In one embodiment, an IS-IS (Intermediate System-to-Intermediate System) database used by DCE (Data Center Ethernet) forwarding, is used to determine the edge switch at which the given MAC address, VLAN pair resides. The selection of the server to which to move the virtual machine is based on network information (e.g., application traffic patterns, bandwidth requirements, network topology). For each server in the eligible server pool, Dijkstra's algorithm can be used to calculate a path cost to each of the edge switches that the MAC, VLAN pairs are connected. In one embodiment, the path cost of each link is available via the database provided by IS-IS used in DCE forwarding. The path cost used in DCE forwarding is typically reflective of the latency of the path. Algorithms, however, may also take latency measurements into account. This calculation may be performed entirely by the edge switch 16 connected to the physical server 26 requiring movement of local VM B, or may be performed by the management station 32, server 26, or a combination of network devices (FIG. 1).

It is to be understood that the IS-IS database referred to above is just one example and that other L2 routing databases such as IETF TRILL (Transparent Interconnection of Lots of Links) may also be used.

Figure 5:
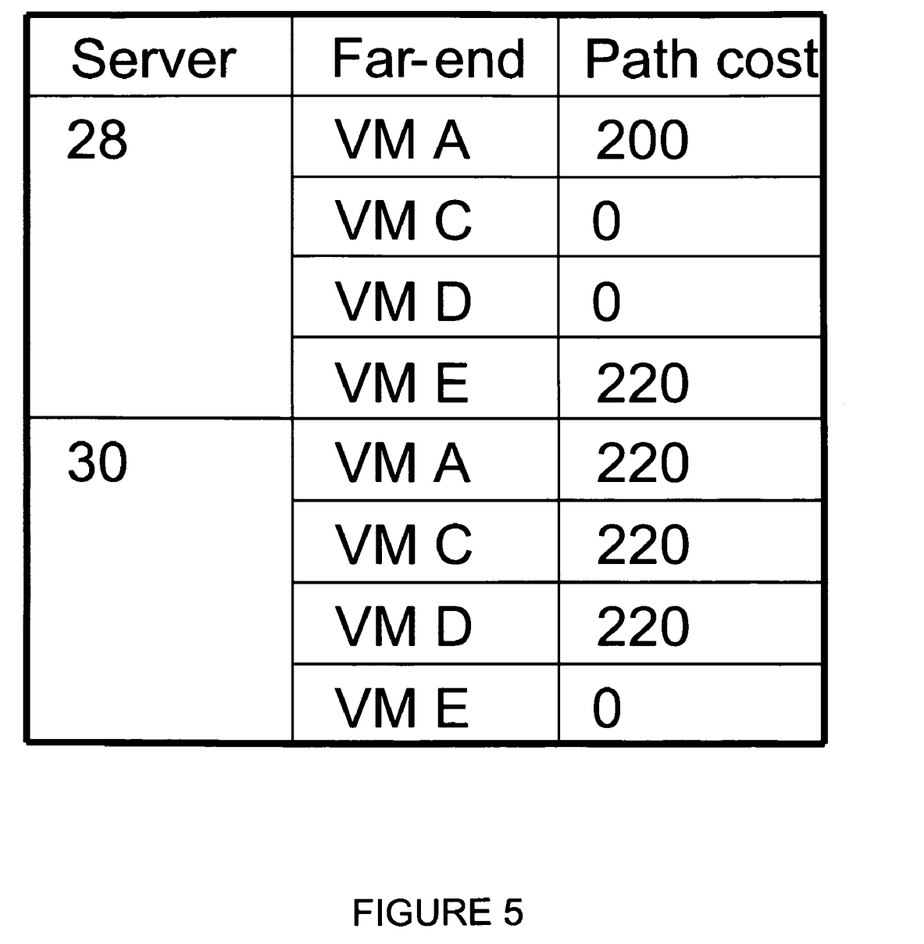
FIG. 5 is a table listing path costs from eligible servers to far-end virtual machines.

FIG. 5 is a table illustrating sample calculations for path cost from servers 28 and 30 to VM B's far-end communication partners (VM A, VM C, VM D, VM E). Since VM C and VM D are currently located at server 28, there is no path cost between these virtual machines and server 28.

Figure 6:
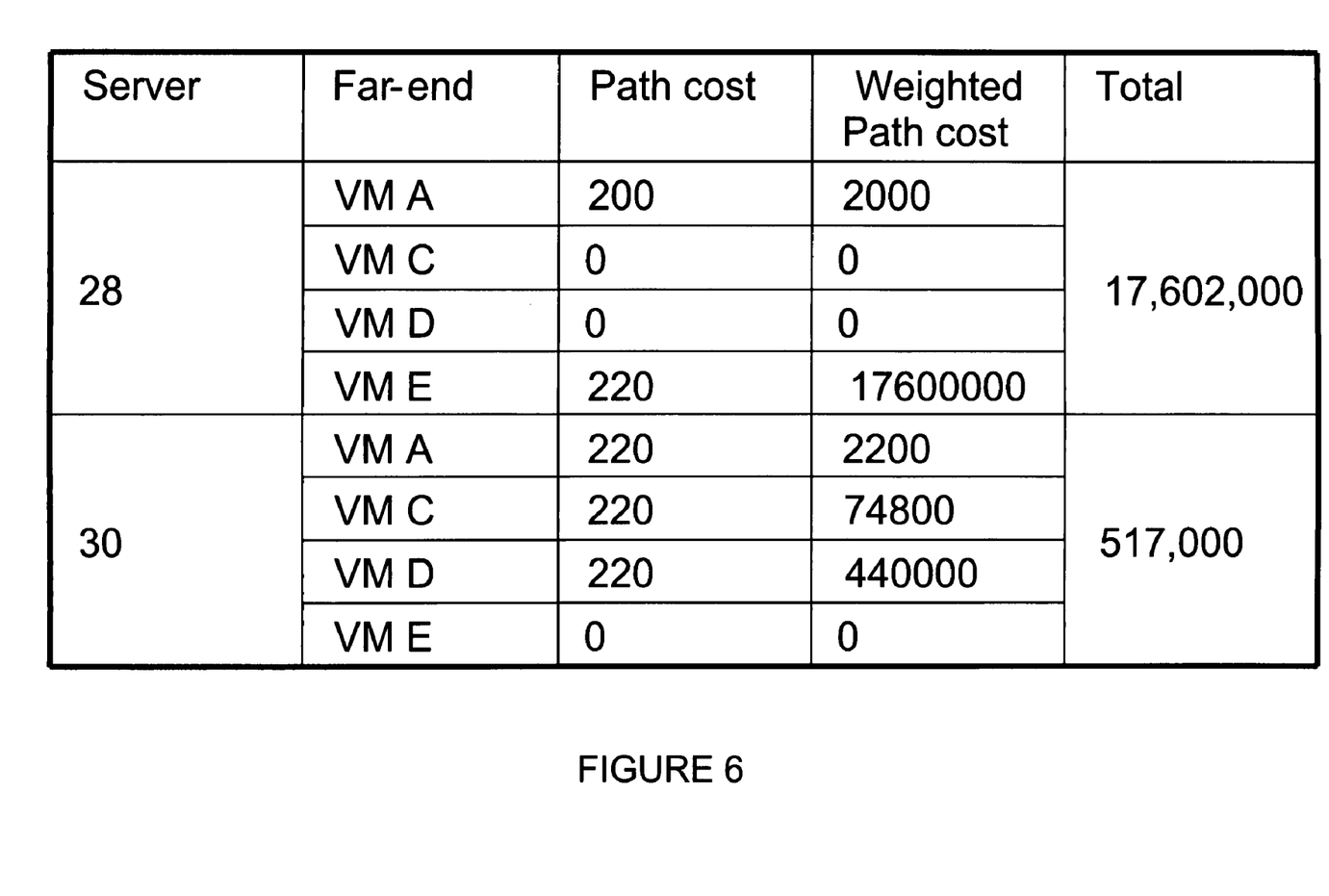
FIG. 6 is a table listing weighted path costs based on bandwidth utilization between virtual machines.

In one embodiment, a weight is applied to each path cost based on bandwidth utilization. FIG. 6 shows the table of FIG. 5 with weighted path cost based on bandwidth used between VM B and far-end communication partners (FIGS. 4 and 6). Each path cost is multiplied by the bandwidth recorded to that MAC address, VLAN pair (FIGS. 4 and 6). The weighted path costs are all added together to get a total cost for a particular physical server in the eligible server pool, with the bandwidth used between applications taken into account. Once this is done for all of the servers in the eligible server pool, the server with the lowest total cost is the best server to place the virtual machine from a network perspective. As shown in FIG. 6, the lowest weighted path cost is at server 30. Thus, path cost calculations determine that VM B should migrate to server 30 based on network information.

VM B is moved from server 26 (first network device) to server 30 (second network device) at step 60 (FIGS. 1 and 3). The move may be performed using VMotion technology, for example. The virtual machine is preferably moved live, while maintaining continuous service availability. The virtual machine move event may be triggered by communicating with a VMware ESX server, for example, or through the Virtual Center API. The move may be automatically performed or an alarm may be raised to alert the user of the recommended action.

Figure 7:
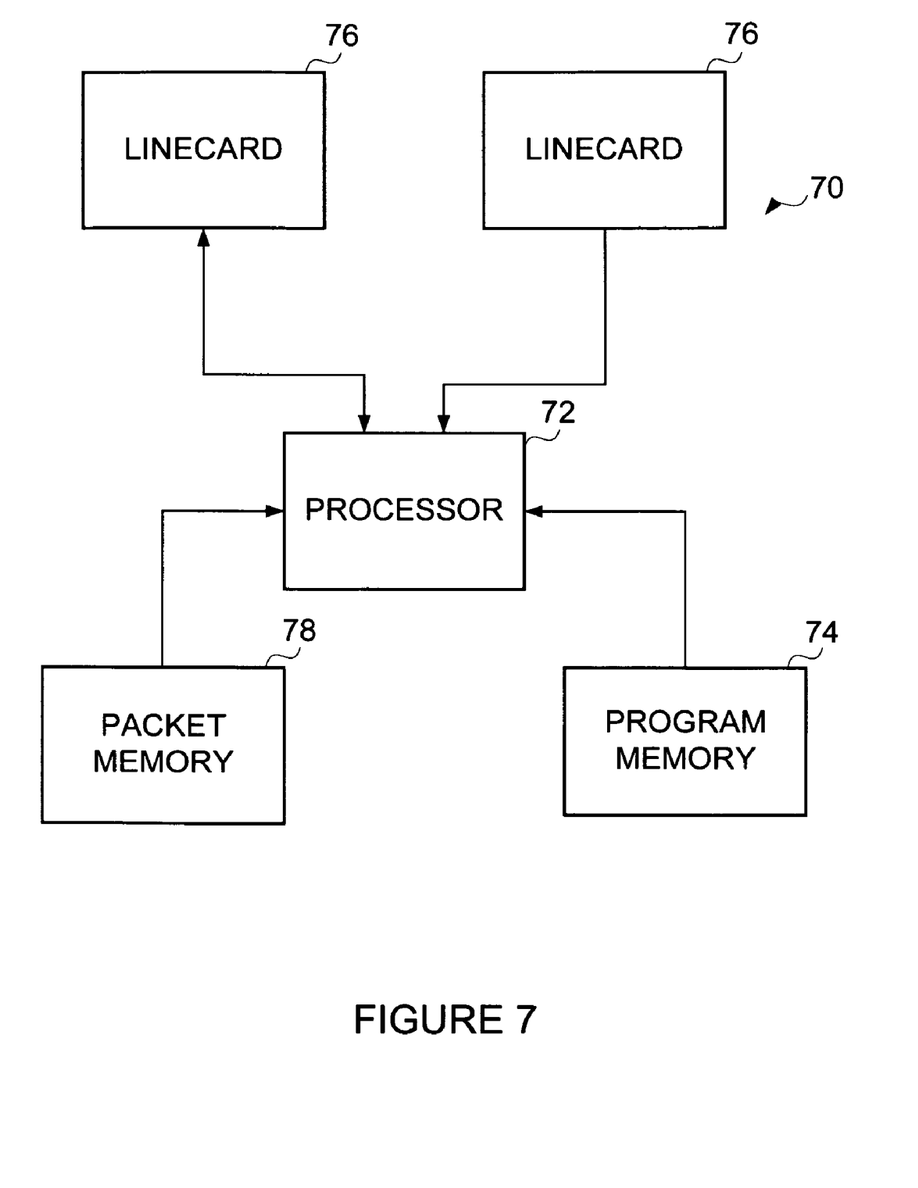
FIG. 7 depicts an example of a network device useful in implementing embodiments described herein.

FIG. 7 depicts a network device 70 that may be used to implement embodiments described herein. Network device 70 is configured to implement all of the network protocols and extensions thereof described above. In one embodiment, network device 70 is a programmable machine that may be implemented in hardware, software, or any combination thereof. Logic may be encoded in one or more tangible media for execution by a processor. For example, processor 72 may execute codes stored in a program memory 74. Program memory 74 is one example of a computer-readable medium. Program memory 74 can be a volatile memory. Another form of computer-readable medium storing the same codes is a type of non-volatile storage such as floppy disks, CD-ROMs, DVD-ROMs, hard disks, flash memory, etc.

Network device 70 interfaces with physical media via a plurality of linecards 76. Linecards 76 may incorporate Ethernet interfaces, DSL interfaces, Gigabit Ethernet interfaces, 10-Gigabit Ethernet interfaces, SONET interfaces, etc. As packets are received, processed, and forwarded by network device 70, they may be stored in a packet memory 78. To implement functionality according to the system, linecards 96 may incorporate processing and memory resources similar to those discussed above in connection with the network device as a whole. It is to be understood that the network device 70 shown in FIG. 7 and described above is only one example and that different configurations of network devices may be used.

As can be observed from the foregoing, the embodiments described herein provide numerous advantages. For example, conventional virtual machine resource scheduling does not take into account network resources. By considering application communication traffic patterns, bandwidth considerations, and network topology, application performance can be improved, bandwidth reduced, and network resources optimized. The embodiments described herein optimize utilization of available resources through proper virtual machine placement, thus providing higher application performance, better hardware utilization, and cost reduction.

Although the method and apparatus have been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for resource allocation in a network comprising a plurality of virtual machines located at network devices in communication with one or more switches, the method comprising:

monitoring network traffic associated with a first of said network devices comprising at least one of said plurality of virtual machines;
storing bandwidth information for interactions between said plurality of virtual machines;
determining if one or more parameters exceed a predefined threshold at said first network device; and
if said one or more parameters exceed said predefined threshold:
   selecting one of said virtual machines to move to a second network device;
   calculating costs between said plurality of virtual machines that have not been selected and network devices eligible to receive said selected virtual machine;
   applying a weight to each of said path costs based on said bandwidth information to create weighted path costs for each of said eligible network devices; and
   selecting said second network device based on said weighted path costs; and
   moving said selected virtual machine to the second network device.

2. The method of claim 1 further comprising identifying resource availability in the network to identify said eligible network devices.

3. The method of claim 2 wherein identifying resource availability in the network comprises monitoring and advertising server availability at the first network device.

4. The method of claim 1 wherein said parameters comprise network parameters and processing and memory requirements at the first network device.

5. The method of claim 1 wherein monitoring network traffic associated with said first network device comprises generating a traffic matrix comprising bandwidth utilization between said virtual machines.

6. The method of claim 1 wherein determining if one or more of said parameters exceed a predefined threshold comprises determining if a bandwidth for said virtual machine located at said first network device exceeds said predefined threshold for a specified period of time.

7. The method of claim 1 wherein monitoring network traffic comprises monitoring network traffic at one of the switches and further comprising receiving some of said bandwidth information from the other switches.

8. The method of claim 1 further comprising transmitting said bandwidth information for said monitored traffic to the other switches.

9. An apparatus for resource allocation in a network comprising a plurality of virtual machines located at network devices in communication with one or more switches, the apparatus comprising:
   a monitor configured for monitoring network traffic associated with one or more of said plurality of virtual machines located at the apparatus;
   a controller configured for determining if one or more parameters exceed a predefined threshold and if said one or more of said parameters exceed said predefined threshold, select one of said virtual machines to move to one of the network devices, calculate path costs between said plurality of virtual machines that have not been selected and network devices eligible to receive said selected virtual machine, apply a weight to each of said path costs based on said bandwidth information for interactions between said virtual machines to create weighted path costs for each of said eligible network devices, select the network device based on said weighted path cost, and move said selected virtual machine to the network device; and
   memory for storing bandwidth information for interactions between said plurality of virtual machines.

10. The apparatus of claim 9 further comprising a transmitter configured for advertising resource availability at the apparatus.

11. The apparatus of claim 10 wherein said resource availability comprises available CPU, memory, and bandwidth.

12. The apparatus of claim 9 wherein said selection is further based on latency information.

13. The apparatus of claim 9 wherein the monitor is configured to generate a traffic matrix comprising bandwidth utilization between said virtual machines.

14. The apparatus of claim 9 wherein determining if one or more parameters exceed a predefined threshold comprises determining if a bandwidth for said virtual machine located at said first network device exceeds said predefined threshold for a specified period of time.

15. The apparatus of claim 9 wherein said stored bandwidth information comprises bandwidth information from said monitored network traffic and bandwidth information received from the network.

16. An apparatus for resource allocation in a network comprising a plurality of virtual machines located at network devices in communication with one or more switches, the apparatus comprising:
   a monitor for monitoring network traffic associated with a first of said network devices comprising at least one of said plurality of virtual machines;
   memory for storing bandwidth information for interactions between said plurality of virtual machines;
   means for determining if one or more parameters exceed a predefined threshold at said first network device and if said one or more parameters exceed said predefined threshold:
      means for selecting one of said virtual machines to move to a second network device calculating path costs between said plurality of virtual machines that have not been selected and network devices eligible to receive said selected virtual machine, and applying a weight to each of said path costs based on said bandwidth information for interactions between said virtual machines to create weighted path costs for each of said eligible network devices;
      means for selecting said second network device based on network information including network traffic and topology; and
      means for moving said selected virtual machine to the second network device.

17. The apparatus of claim 16 wherein said stored bandwidth information comprises bandwidth information from said monitored network traffic and bandwidth information received from the network.

* * * * *